(12) United States Patent
Lucas et al.

(10) Patent No.: US 12,440,815 B2
(45) Date of Patent: Oct. 14, 2025

(54) SIMULTANEOUS METERED BULK DELIVERY FROM TWO OR MORE BULK STORAGE CONTAINERS INTO A MIXED STORAGE VESSEL

(71) Applicant: Halliburton Energy Services, Inc., Houston, TX (US)

(72) Inventors: Bryan C. Lucas, Duncan, OK (US); Ernst Rudolf Man Schnell, Houston, TX (US); Elizabeth Wells, Carrollton, TX (US); Craig Allen Sneed, Duncan, OK (US); Nebojsa Knezevik, Fort Lupton, CO (US)

(73) Assignee: Halliburton Energy Services, Inc., Houston, TX (US)

( * ) Notice: Subject to any disclaimer, the term of this patent is extended or adjusted under 35 U.S.C. 154(b) by 248 days.

(21) Appl. No.: 18/107,145

(22) Filed: Feb. 8, 2023

(65) Prior Publication Data

US 2024/0261747 A1    Aug. 8, 2024

(51) Int. Cl.
*B01F 35/22* (2022.01)
*B01F 23/60* (2022.01)
(Continued)

(52) U.S. Cl.
CPC .......... *B01F 35/2202* (2022.01); *B01F 23/69* (2022.01); *B01F 25/10* (2022.01);
(Continued)

(58) Field of Classification Search
CPC .............. B01F 35/2202; B01F 35/2218; B01F 33/5023; B01F 35/714; B01F 35/2117;
(Continued)

(56) References Cited

U.S. PATENT DOCUMENTS 4,345,858 A * 8/1982 Barlow ................ G01G 13/028
406/33
4,410,106 A * 10/1983 Kierbow ................ G01F 11/24
406/53

(Continued)

FOREIGN PATENT DOCUMENTS

KR       10-1432050 B1    5/2009
WO    WO-2018022064 A1 *  2/2018    .......... B65D 88/129

*Primary Examiner* — Paul R Durand
*Assistant Examiner* — Michael J. Melaragno
(74) *Attorney, Agent, or Firm* — John Wustenberg; Parker Justiss, P.C.

(57) ABSTRACT

The system, in one aspect, includes a first bulk storage container for holding a first bulk dry flowable material having a first dispensing assembly coupled with a first outlet, and a second bulk storage container for holding a second bulk dry flowable material having a second dispensing assembly coupled with the second outlet. The system, in one aspect, may further include a mixed storage vessel, as well as a controller in communication with the first dispensing assembly and the second dispensing assembly, the controller programmed to cause the first dispensing assembly to discharge the first amount of the first dry flowable material to the mixed storage vessel and cause the second dispensing assembly to discharge the second amount of the second dry flowable material to the mixed storage vessel over a comparable time period based upon weight based readings the controller receives from first and second load cells.

20 Claims, 8 Drawing Sheets

(51) Int. Cl.
*B01F 25/10* (2022.01)
*B01F 33/502* (2022.01)
*B01F 33/84* (2022.01)
*B01F 35/21* (2022.01)
*B01F 35/221* (2022.01)
*B01F 35/71* (2022.01)
*B01F 101/49* (2022.01)

(52) U.S. Cl.
CPC ........ *B01F 33/5023* (2022.01); *B01F 33/844* (2022.01); *B01F 35/2117* (2022.01); *B01F 35/2218* (2022.01); *B01F 35/714* (2022.01); *B01F 2101/49* (2022.01)

(58) Field of Classification Search
CPC ........ B01F 23/69; B01F 33/844; B01F 25/10; B01F 2101/49
See application file for complete search history.

(56) References Cited

U.S. PATENT DOCUMENTS

| | | | | |
|---|---|---|---|---|
| 4,427,133 | A * | 1/1984 | Kierbow | G01F 11/24 222/164 |
| 5,775,852 | A * | 7/1998 | Boutte | B65B 69/0091 406/120 |
| 6,188,936 | B1 * | 2/2001 | Maguire | B01F 35/2207 366/18 |
| 7,240,807 | B2 * | 7/2007 | Hoff | G01G 13/026 222/77 |
| 7,762,714 | B2 * | 7/2010 | Freeman | B01F 23/54 73/434 |
| 9,718,040 | B2 * | 8/2017 | Sacchi | B65G 65/32 |
| 10,783,678 | B2 | 9/2020 | Albrighton et al. | |
| 2002/0191483 | A1 * | 12/2002 | Ohtsuki | B01F 25/431 366/107 |
| 2009/0110608 | A1 | 4/2009 | Vierheilig et al. | |
| 2013/0269735 | A1 | 10/2013 | Roetzel et al. | |
| 2015/0085601 | A1 | 3/2015 | Hammerlund | |
| 2017/0327326 | A1 * | 11/2017 | Lucas | B01F 35/71731 |
| 2017/0334639 | A1 * | 11/2017 | Hawkins | B65D 90/125 |
| 2018/0028992 | A1 * | 2/2018 | Stegemoeller | B01F 33/8051 |
| 2020/0038825 | A1 * | 2/2020 | Weeter | B01F 23/59 |
| 2022/0081231 | A1 | 3/2022 | Knezevik et al. | |
| 2024/0261747 | A1 * | 8/2024 | Lucas | B01F 35/714 |

* cited by examiner

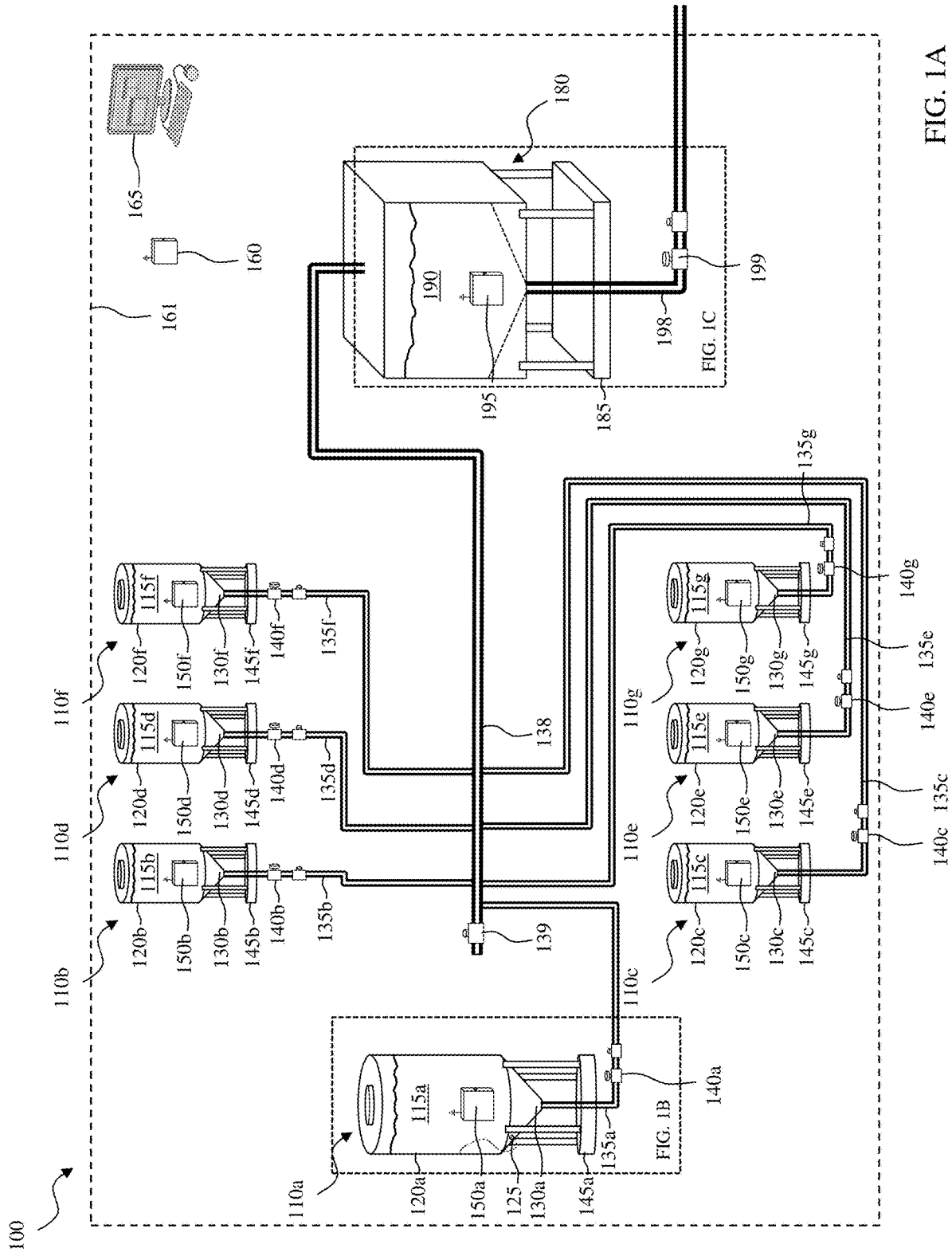

SIMULTANEOUS METERED BULK DELIVERY FROM TWO OR MORE BULK STORAGE CONTAINERS INTO A MIXED STORAGE VESSEL

BACKGROUND

The present disclosure relates generally to systems and methods for use in dispensing operations, and more specifically, to improved systems and methods for metering, mixing, blending and dispensing dry flowable materials used in wellbore operations.

During the drilling and completion of oil and gas wells, cement is used for a number of purposes, mainly as a sealant for sections on the in- and outside of installed wellbore tubulars. The cement is normally produced by combining a mixture of a plurality of different dry flowable materials (e.g., bulk solids, sand, extenders, weighting agents, powders, granules, functional admixtures, etc.) with water at the well site as they are needed for a particular treatment. Systems for metering and combining the dry flowable material mixture and water are normally mobile (e.g., skid- or truck-mounted), since they are needed for only short periods of time at a well site.

However, the dry flowable material mixture itself is normally mixed off site, and then transported to a well site in a commercial or common carrier tank truck. Once the tank truck and system for metering and combining the dry flowable material mixture and water are at the well site, the dry flowable material mixture must be transferred or conveyed from the tank truck into a supply tank for metering into a blender as needed. Well sites typically include one or more silos or supply tanks that are filled pneumatically on location with the dry flowable material mixture and then connected to the blender through a series of pneumatic hoses, belts or auger conveyors. The silos or supply tanks provide a large capacity of the dry flowable material mixture to be supplied to the blender. Discharge gates on the silos or supply tanks output the dry flowable material mixture to the pneumatic hoses or conveyors, which then transfer the dry flowable material mixture to the blender, for mixing with the water to create the cement slurry.

BRIEF DESCRIPTION

Reference is now made to the following descriptions taken in conjunction with the accompanying drawings, in which:

FIGS. 1A through 1C illustrate a schematic diagram of a dry good dispensing system designed, manufactured and/or operated in accordance with one or more embodiments of the disclosure;

DETAILED DESCRIPTION

Figure 1B:
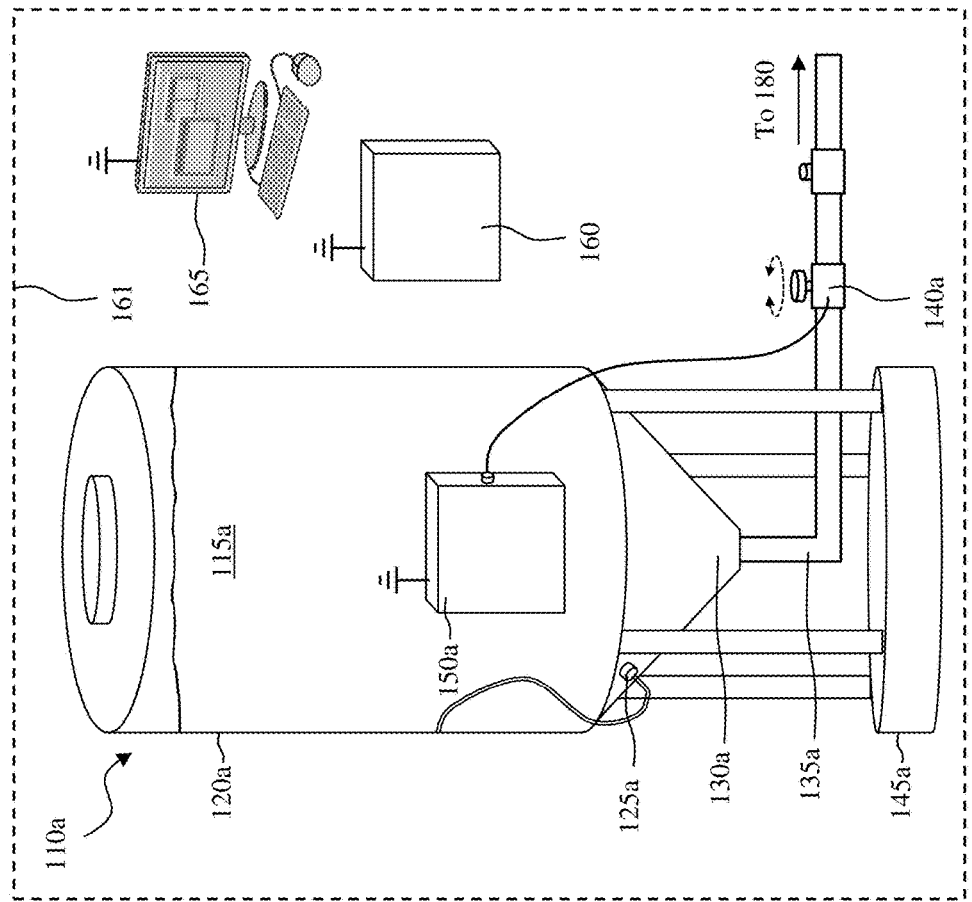

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms.

Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect." "engage," "couple," "attach," or any other like term describing an interaction between elements is not meant to limit the interaction to direct interaction between the elements and may also include indirect interaction between the elements described.

The present disclosure is based, at least one part, on the recognition that it is often time consuming, and thus costly, to meter and blend various different bulk dry flowable materials to result in an acceptable dry flowable material mixture, as might be combined with water to be included within a given wellbore. Specifically, the present disclosure has recognized that the sequential metering and subsequent mixing of the various different bulk dry flowable materials, followed by several transfers of the blend for homogenization, is unduly time consuming. With these recognitions in mind, the present disclosure has designed a novel dry flowable material dispensing system that employs a controller that is in communication with each different dispensing assembly related to each of the different bulk dry flowable materials, such that each of the different dry flowable materials are metered into a common mixed storage vessel over a comparable time period (e.g., regardless of the percent volume that a given bulk dry flowable material makes of the final dry flowable material mixture). The phrase "mixed storage vessel," as used herein and unless otherwise instructed, is intended to include any container, pipe, housing, etc. that may accept and/or collect the final dry flowable material mixture. In certain embodiments, the mixed storage vessel is a mixed storage container, and in other embodiments the mixed storage vessel is a transport tank or a pipe coupled directly to a cement pump unit. For example, the controller could be configured to communicate with and control each of the different dispensing assemblies (e.g., and each associated different load cell) of each of the different bulk storage containers to meter the different bulk dry flowable materials into the mixed storage vessel over a specific time period equal to the longest meter time of any one bulk dry flowable material (e.g., based upon inputs the controller receives from load cells associated with the bulk storage containers). This will ensure that all of the different bulk dry flowable materials enter the mixed storage vessel over a comparable time period, such that the different bulk dry flowable materials will be automatically blended together substantially homogeneously (e.g., not layered) and matching the desired blend design.

In one illustrative embodiment, the resulting dry flowable material mixture might consist of 100,000 lbs. of cement, 20,000 lbs. of a first additive, 500 lbs. of a second additive, and 100 lbs. of a third additive. In this embodiment, the cement has the largest volume, and thus would typically have the longest meter time, as well as easiest metering (e.g., given the large volume). Similarly, the second and third additives would have the smallest volumes, which would traditionally have the shortest metering times, as well as most difficult metering (e.g., given the smaller volumes). Accordingly, in accordance with one embodiment of the disclosure the first, second and third additives would be set to be metered over a comparable time period as the cement. The phrase comparable time period, as used herein, means plus or minus 5 percent of the longest meter time. In yet another embodiment, the first, second and third additives would be set to be metered over a similar time period as the cement. The phrase similar time period, as used herein, means plus or minus 2 percent of the longest meter time. In yet another embodiment, the first, second and third additives would be set to be metered over an identical time period as the cement. The phrase identical time period, as used herein, means plus or minus 1 percent of the longest meter time. In one more embodiment, the first, second and third additives would be set to be metered over an exact time period as the cement. The phrase exact time period, as used herein, means plus or minus 0.1 percent of the longest meter time. For example, in the above embodiment:

Cement=100,000 lbs., 10 min. to fill.=10,000 lbs./min.
Additive 1=20,000 lbs., 10 min. to fill.=2,000 lbs./min. (controller adjusted)
Additive 2=500 lbs., 10 min. to fill.=50 lbs./min. (controller adjusted)
Additive 3=100 lbs., 10 min. to fill.=10 lbs./min. (controller adjusted)

In this example, the four different bulk dry flowable materials will enter the mixed storage vessel over a comparable time period, for the same duration but at different rates based upon weight basted (e.g., static weight based) readings of each of the load cells associated with each of the four different bulk dry flowable materials, which means they will come into the mixed storage vessel nearly completely homogeneous. In at least one embodiment, a metering rate of any one bulk dry flowable material will vary by less than 10 percent (e.g., if not by less than 5 percent, 3 percent, 1 percent or 0.5 percent) during the comparable time period, again resulting in the nearly completely homogeneous dry flowable material mixture. In one or more embodiments, this will reduce the metering process of the dry flowable material mixture down to 10 minutes or less (e.g., from approximately 58 minutes using traditional metering methods), and will eliminate the need for "blending" or "boxing" (e.g., saving approximately 31 additional minutes, as compared to using traditional blending methods).

The present disclosure has recognized that static weight based readings, such as the weight based readings employed herein, are much more accurate than dynamic mass or volume flow based readings, as might be used in the prior art. For example, the present disclosure has recognized, for the first time in cement blending applications, that certain small volumes of the additives are not well suited for the dynamic based readings. For example, the present disclosure has recognized that dynamic volume flow readings and/or dynamic mass flow readings can not appropriately meter the aforementioned small volumes. Accordingly, the present disclosure has based its metering technology on weight based readings (e.g., static weight based readings) of each of the bulk storage containers, which are highly effective as compared to the dynamic readings currently employed.

The systems and methods of the present disclosure may be automated in order to reduce the human involvement in dispensing bulk dry flowable materials. As such, the automation of dispensing bulk dry flowable materials may allow for accurate and continuous dispensing while also reducing the amount of equipment (e.g., intermediary containers) and/or human contact that are typically required when dispensing bulk dry flowable materials. Moreover, the systems and methods of the present disclosure may, in turn, reduce the amount of time and operational costs required to dispense the bulk dry flowable materials. Accordingly, the systems and methods of the present disclosure provide one or more dry good dispensing systems that may simplify the dispensing of bulk dry flowable materials, improve the process efficiency, and reduce the potential of human error.

In certain embodiments, the systems and methods of the present disclosure may be employed to provide dry flowable materials for use in a variety of treatment processes used in wellbore operations. As used herein, unless the context otherwise requires, the phrase "bulk dry flowable materials" includes and may refer to any type of bulk dry material, including but not limited to dry additives, particulates, powders, granules, bulk solids, grains, and the like. For example, in some embodiments, the disclosed systems and methods may be utilized to dispense any number of bulk dry flowable materials (e.g., bulk solids, proppant, diverters, sand, powders, granules, etc.) for diversions, conductor-frac applications, cement mixing, drilling mud mixing, and other fluid mixing applications. However, it should be noted that the systems and methods of the present disclosure may be used in other contexts as well. For example, the dry good dispensing system may be used in agricultural applications to dispense grain, feed, seed, or mixtures of the same. Numerous other applications may be realized for handling and dispensing various bulk dry flowable materials in a metered fashion to a desired location in accordance with the methods and systems of the present disclosure.

Figure 1C:
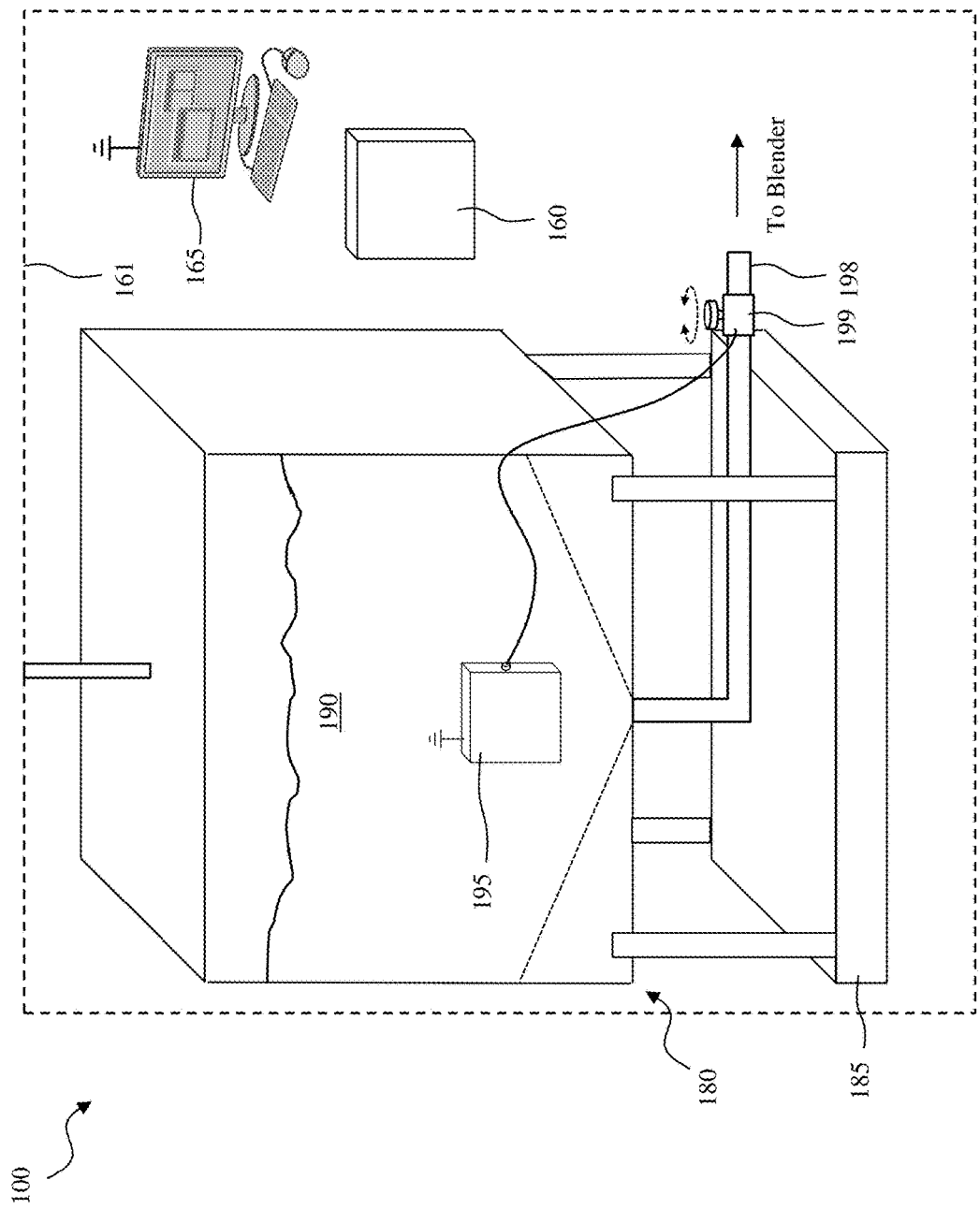

Turning now to the drawings, a system in accordance with the present disclosure will now be described. FIGS. 1A through 1C illustrate a schematic diagram of a dry good dispensing system 100 designed, manufactured and/or operated in accordance with one or more embodiments of the disclosure. The dry good dispensing system 100, in accordance with the disclosure, includes a plurality of bulk storage containers 110 for holding bulk dry flowable material 115 therein. In at least one embodiment, the dry good dispensing system 100 includes a first bulk storage container 110a for holding a first bulk dry flowable material 115a therein, and a second bulk storage container 110b for holding a second bulk dry flowable material 115b therein. In other embodiments, the dry good dispending system 100 includes three or more bulk storage containers 110 for holding three or more different bulk dry flowable materials 115 therein. In yet other embodiments, such as that shown, the dry good dispensing system 100 additionally includes third, fourth, fifth, sixth and seventh bulk storage containers 110c, 110d, 110e, 110f, 110g for holding, third, fourth, fifth, sixth and seventh bulk dry flowable materials 115c, 115d, 115e, 115f, 115g therein.

The exact number of bulk storage containers 110 that the dry good dispensing system 100 may include depends on a combination of factors such as, for example, the volume and width of the bulk storage containers 110, the demands of the operation, and/or the amount of space available to house the dry good dispensing system 100 (e.g., a warehouse building, a mobile trailer unit). In certain embodiments, the dry good dispensing system 100 may include two or more bulk storage containers 110 in an amount sufficient to improve the process efficiency of dispensing dry flowable materials. In certain embodiments, the dry good dispensing system 100 may include up to 30 bulk storage containers 110; however, in certain circumstances, more bulk storage containers 110 may be desired and will be entirely suitable for practice of the present disclosure. In such embodiments, the number of bulk storage containers 110 may range up to any one of: 31, 32, 33, 34, 35, 36, 37, 38, 39 bulk storage containers 110, and so on up to 99 bulk storage containers 110 in in increments of 1 bulk storage container 110. In some embodiments, the dry good dispensing system 100 may include bulk storage containers 110 in a number of from about 2 to about 30. In some embodiments, the dry good dispensing system 100 may include bulk storage containers 110 in a number of from about 11 to about 30. In other embodiments, the dry good dispensing system 100 may include bulk storage containers 110 in a number of about 21 to about 30.

In at least one embodiment, the plurality of bulk storage containers 110 are separate from each other and independently transportable to, from, and/or about the site (e.g., for placement with or removal from the dry good dispensing system 100). In at least one other embodiment, the plurality of bulk storage containers 110 may be completely separable and transportable from the dry good dispensing system 100, such that any bulk storage container 110 may be selectively removed from the dry good dispensing system 100 and replaced with another bulk storage container 110. That way, once the amount of bulk dry flowable material 115 (e.g., additives) in a given bulk storage container 110 runs low or empties, a new bulk storage container 110 may be placed in the dry good dispensing system 100 to continue a batch transfer of dry flowable materials to a mixed storage vessel 180. In some instances, a bulk storage container 110 may be removed from the dry good dispensing system 100 and replaced by another bulk storage container 110 holding the same type or a different type of bulk dry flowable materials 115 to be provided to the mixed storage vessel 180.

In at least one embodiment, each of the bulk storage containers 110 includes a vessel 120 having an outlet 130 that is connected to and extending downward from the vessel 120 to route the bulk dry flowable materials 115 from the vessel 120 to a mixed storage vessel 180 using one or more conduits 135. In the illustrated embodiment of FIGS. 1A and 1B, the bulk storage containers 110*a*, 110*b*, 110*c*, 110*d*, 110*e*, 110*f*, 110*g* include vessels 120*a*, 120*b*, 120*c*, 120*d*, 120*e*, 120*f*, 120*g* and outlets 130*a*, 130*b*, 130*c*, 130*d*, 130*e*, 130*f*, 130*g*, respectively. In this embodiment, the outlets 130*a*, 130*b*, 130*c*, 130*d*, 130*e*, 130*f*, 130*g* couple (e.g., directly or indirectly) with the mixed storage vessel 180 via the conduits 135*a*, 135*b*, 135*c*, 135*d*, 135*e*, 135*f*, 135*g*. For example, in the embodiment of FIGS. 1A through 1C, the conduits 135*a*, 135*b*, 135*c*. 135*d*, 135*e*, 135*f*, 135*g* couple to a common conveyance 138 positioned between the bulk storage containers 110*a*, 110*b*, 110*c*, 110*d*, 110*e*, 110*f*. 110*g* and the mixed storage vessel 180. In at least one embodiment, the common conveyance 138 is configured to employ Karman vortex mixing (e.g., using one or more geometrical inserts within the common conveyance 138) to further mix the bulk dry flowable materials (e.g., regardless of how many there may be) travelling therethrough.

The conduits 135*a*, 135*b*, 135*c*, 135*d*, 135*e*, 135*f*, 135*g* may be a pipe or hose through which the dry flowable materials 115 may flow from the vessels 120 to the mixed storage vessel 180. In some embodiments, the conduits 135*a*, 135*b*, 135*c*, 135*d*, 135*e*, 135*f*, 135*g* may include a safety/shut-off valve (not shown) for resolving an abnormal condition, such as preventing an uncontrollable flow of bulk dry flowable materials 115 to the mixed storage vessel 180. For example, in some embodiments, the safety/shut-off valve may prevent an uncontrollable flow of bulk dry flowable materials 115 to the mixed storage vessel 180 after a power failure. In such embodiments, the safety/shut-off valve may be closed until the dry good dispensing system 100 has returned to normal operation.

In some embodiments, the vessels 120 may be made of any metal, plastic, or other material that allows the vessels 120 to hold the bulk dry flowable materials 115. For example, in one or more embodiments the vessels 120 are pliable sacks. In some embodiments, the vessels 120 may be equipped with one or more agitation devices 125, such as any vibrator, aerator, or other type of agitation device that is configured to mix and/or agitate the bulk dry flowable materials 115 within each vessel 120.

In at least one embodiment, each of the bulk storage containers 110 includes a dispensing assembly 140. In one or more embodiments, the dispensing assemblies 140 are configured to open and close to controlled dispense an amount of the bulk dry flowable material 115 being discharged from the vessels 120. In the illustrated embodiment of FIGS. 1A and 1B, the bulk storage containers 110*a*, 110*b*, 110*c*, 110*d*, 110*e*, 110*f*, 110*g* include dispensing assemblies 140*a*, 140*b*, 140*c*, 140*d*, 140*e*, 140*f*, respectively. Accordingly, the dispensing assemblies 140*a*, 140*b*, 140*c*, 140*d*, 140*e*, 140*f* are configured to open and close to controlled dispense an amount of the bulk dry flowable materials 115*a*, 115*b*, 115*c*, 115*d*, 115*e*, 115*f*, 115*g* being discharged from the vessels 120*a*, 120*b*, 120*c*, 120*d*, 120*e*, 120*f*, 120*g* and flowing to the mixed storage vessel 180.

Any type of dispensing assembly 140 may be used, so long as it is capable of controlled dispensing certain small volumes that may be required. For example, the dispensing assembly 140 could be a throttling valve configured to adjust anywhere between opened and closed to controlled dispense certain small volumes that may be required. In at least one embodiment, however, one or more of the dispensing assemblies are rotary air lock valves or pinch valves. In at least one other embodiment, one or more of the dispensing assemblies are screw conveyors. In yet at least one other embodiment, multiple different types of dispensing assemblies are used within the dry good dispensing system 100 (e.g., based upon the different material properties (granular, powder, dense, etc.) and/or volumes of the different bulk dry flowable materials). In some embodiments, the dispensing assembly 140 may be selectively actuated into an open or partially open position, thereby allowing the bulk dry flowable materials 115 to flow through the outlet 130 and into the mixed storage vessel 180. In other embodiments, when it is desired to stop the flow of bulk dry flowable materials 115 or once its corresponding vessel 120 is emptied, the dispensing assembly 140 may be actuated to a closed position, inter alia, to block the flow of the bulk dry flowable materials 115 to the mixed storage vessel 180.

In some embodiments, the dry good dispensing system 100 may include one or more actuators (not shown) used to actuate the dispensing assemblies 140. The one or more actuators may be communicatively coupled to the one or more bulk storage containers 110 and their corresponding dispensing assemblies 140. Examples of one or more actuators that may be suitable in certain embodiments include rotary actuators, linear actuators, pneumatic actuators, or any other desired type of actuators for engaging and moving the dispensing assemblies 140 anywhere between closed and open positions. The actuators may be automated and, in some instances, may allow for manual override of the automated system.

In some embodiments, any suitable valves, pumps, vacuum blowers, augers, screws, conveyors or other devices may be also used for controlling the flow of bulk dry flowable materials 115 through the conduit 135 to the mixed storage vessel 180.

In at least one embodiment, each of the bulk storage containers 110 includes a load cell base 145 (e.g., including one or more load cells (not shown)) positioned under ones of the vessels 120. The load cell base 145 and associated load cells may be used for measuring a weight of the bulk dry flowable materials 115 held within each corresponding vessel 120 (e.g., a static weight of the bulk dry flowable materials 115 held within each corresponding vessel 120). In at least one embodiment, the load cell base 145 and associated load cells directly and continuously measure the weight of the bulk dry flowable materials 115 within the associated vessels 120. For example, in some embodiments, the load cell base 145 includes four load cells, in which each load cell is disposed in a corner of the load cell base 145, in order to appropriately weigh the bulk dry flowable materials 115 in each vessel 120. Examples of the one or more load cells include but are not limited to strain gauges, piezoelectric gauges, hydraulic gauges, pneumatic gauges, or similar devices. Each of the load cells, in one or more embodiments, is connected using a wired or wireless connection to a scale indicator (not shown). In the illustrated embodiment of FIGS. 1A and 1B, the bulk storage containers 110a, 110b, 110c, 110d, 110e, 110f, 110g include load cell bases 145a, 145b, 145c. 145d, 145c, 145f, respectively.

To the extent possible (e.g., depending on the type of dry flowable material), in an alternative embodiment a flow meter could be used in addition to the weight based measurements (e.g., static weight based measurements of the bulk storage containers) to determine an amount of a given bulk dry flowable material 115 exiting any one vessel 120. Moreover, time-based readings from the flow meter may be used to calculate a given flow rate of any given bulk dry flowable material 115 exiting any one vessel 120. It should be noted, however, that the present disclosure does not contemplate a dry good dispensing system that does not employ one or more load cells configured to continuously measure the weight of the bulk dry flowable materials 115 within the associated vessels 120. In at least one other embodiment, however, no flow meters are associated with any of the vessels 120.

In at least one embodiment, the dry good dispensing system 100 may further include one or more control boxes 150 coupled (e.g., wired or wirelessly coupled) to ones of the dispensing assemblies 140 (e.g., as well as the agitators 125 and/or load cells (e.g., via the scale indicators)), the one or more control boxes 150 configured to instruct the dispensing assemblies 140 to open and close to controlled dispense the bulk dry flowable material 115 being discharged therefrom (e.g., based upon the weight based readings from the one or more load cells). In the illustrated embodiment of FIGS. 1A and 1B, the bulk storage containers 110a, 110b, 110c, 110d, 110e, 110f, 110g each include a separate control box 150a, 150b, 150c, 150d, 150e, 150f coupled to a separate dispensing assemblies 140a, 140b, 140c, 140d, 140c, 140f, respectively. Nevertheless, other embodiments exist wherein a single local control box 150 is employed for all of the bulk storage containers 110a, 110b, 110c, 110d, 110c, 110f, 110g, or alternatively a single or more remote control boxes 150 are employed for all of the bulk storage containers 110a, 110b, 110c, 110d, 110c, 110f, 110g.

In one or more embodiments, as shown in FIGS. 1A and 1C, the mixed storage vessel 180 also includes a load cell base 185 (e.g., including one or more load cells (not shown)) positioned thereunder. The load cell base 185 and associated load cells may be used for measuring a weight of the dry flowable mixed material 190 (e.g., a combination of the bulk dry flowable materials 115 from each of the bulk storage containers 110) held within the mixed storage vessel 180. In at least one embodiment, the load cell base 185 and associated load cells directly and continuously measure the weight (e.g., static weight) of the dry flowable mixed materials 190 held within the mixed storage vessel 180. For example, in some embodiments, the load cell base 185 includes four load cells, in which each load cell is disposed in a corner of the load cell base 185, in order to appropriately weigh the dry flowable mixed material 190 held within the mixed storage vessel 180. Examples of the one or more load cells include but are not limited to strain gauges, piezoelectric gauges, hydraulic gauges, pneumatic gauges, or similar devices. Each of the load cells, in one or more embodiments, is connected using a wired or wireless connection to a scale indicator (not shown).

In at least one embodiment, the dry good dispensing system 100 may further include a control box 195 coupled (e.g., wired or wirelessly coupled) to the load cell base 185. In at least one embodiment, a conduit 198 is coupled proximate a bottom surface of the mixed storage vessel 180. The conduit 198, in the illustrated embodiment, is configured to lead to a blender (not shown), such that the dry flowable mixed materials 190 may be combined with the water to complete the high viscosity fluid, as discussed above. The mixed storage box 180 may additionally include one or more dispensing assemblies 199, which in one or more embodiments may be coupled (e.g., wired or wirelessly) to the control box 195 or other control boxes 150 within the dry good dispensing system 100.

In accordance with the disclosure, the dry good dispensing system 100 includes a controller 160 in communication with two or more of the dispensing assemblies 140, for example via the one or more control boxes 150. In this embodiment, the controller 160 is programmed to cause the two or more dispensing assemblies 140 to discharge and meter the bulk dry flowable materials 115 from the vessels 120 to the mixed storage vessel 180 over a comparable time period based upon weight based readings the control system 160 receives from the load cells. For example, if the dry good dispensing system 100 only included the first bulk storage container 110a and the second bulk storage container 110b, the controller 160 would be in communication with the first dispensing assembly 140a and the second dispensing assembly 140b, the controller programmed to cause the first dispensing assembly 140a to discharge and meter the first amount of the first bulk dry flowable material 115a to the mixed storage vessel 180 and cause the second dispensing assembly 140b to discharge and meter the second amount of the second bulk dry flowable material 115b to the mixed storage vessel 180 over a comparable time period based upon weight based readings the controller 160 receives from the load cells. In the given embodiment wherein the dry good dispensing system 100 includes seven bulk storage containers 110a, 110b, 110c. 110d, 110e, 110f, 110g, the controller 160 could be programmed to cause any combination or all of the seven dispensing assemblies 140a, 140b, 140c, 140d, 140e, 140f, 140g to discharge their bulk dry flowable material 115a, 115b, 115c, 115d, 115e, 115f, 115g to the mixed storage vessel 180 over the comparable time period based upon weight based readings the controller 160 receives from the load cells. It should be noted that while the embodiment of FIGS. 1A through 1C makes continual reference to the comparable time period, other similar embodiments could employ the aforementioned similar time period, identical time period or exact time period, as all of those terms are defined above, without departing from the inventive aspects of the present disclosure.

Again, the controller 160 could be configured to communicate with each of the different dispensing assemblies 140 (e.g., and each associated different load cell of each different load cell base 145) of each of the different bulk storage containers 110 to meter the different bulk dry flowable materials 115 into the mixed storage vessel 180 over a specific time period equal to the longest meter time of any one of the bulk dry flowable materials 115. For example, one might assume that the bulk dry flowable material 115 with the greatest volume would require the longest meter time, and in this embodiment the control system 160 would cause the remaining bulk storage containers 110 to meter their bulk dry flowable materials over a comparable time period as the longest meter time. This will help ensure that all of the different bulk dry flowable materials 115 enter the mixed storage vessel 180 over the comparable time period, such that the different bulk dry flowable materials 115 will be automatically blended together substantially homogenously (e.g., not layered).

In yet another embodiment, however, the smaller volume bulk dry flowable materials might dictate the comparable period of time. For example, certain of the smaller volume bulk dry flowable materials might require a minimum flow rate to be accurately dispensed, or else inaccurate dispensing of the smaller volume bulk dry flowable materials might occur. In this embodiment, the controller 160 would instruct the smallest volume bulk dry flowable material to dispense at a workable rate (e.g., one that is accurate), and thereafter instruct the others of the bulk dry flowable materials (e.g., including the largest volume bulk dry flowable material) to dispense over the comparable time period. In even yet another embodiment, the largest volume bulk dry flowable material might dictate the comparable period of time, but could be adjusted in real time to correct and/or react to component flow issues of the smaller volume bulk dry flowable materials.

In at least one embodiment, the controller 160 employs inputs of the weight of each bulk dry flowable material 115 and known settings of the various dispensing assemblies 140 to achieve the aforementioned comparable time period. In yet another embodiment, the controller 160 employs inputs of the weight of each bulk dry flowable material 115 and readings from the load cell bases 145 to achieve the aforementioned comparable periods of time. In yet another embodiment, the controller 160 employs inputs of the weight of each bulk dry flowable material 115 and statistical data of the dry good dispensing system 100 to achieve the aforementioned comparable periods of time. In even yet another embodiment, the controller 160 employs inputs of the weight of each bulk dry flowable material 115 and artificial intelligence (AI) or machine learning (ML) to achieve the aforementioned comparable periods of time. In even another embodiment, the controller 160 employs the weight of each bulk dry flowable material 115 and the flow rates of each bulk dry flowable material 115 to achieve the aforementioned comparable periods of time. For example, in at least one embodiment an Observe, Orient, Decide and Act (OODA) loop strategy may be used as at least a portion of the feedback, such that the dry good dispensing system 100 may learn from prior runs. Moreover, any combination or sub-combination of the foregoing inputs may be used to achieve the aforementioned comparable periods of time.

In at least one other embodiment, the controller 160 employs a feed-back loop to achieve the aforementioned comparable periods of time. For example, the controller 160 could continually take readings from each of the different load cell bases 145 and in real time adjust each of the dispensing assemblies 140 to achieve the aforementioned comparable periods of time.

In one or more embodiments, the dry good dispensing system 100 has a control box 150 for each vessel 120, in which the control box 150 may serve as an input and output station. In such embodiments, the control box 150 may transmit input signals to the controller 160 based on the weight of bulk dry flowable materials 115 in each vessel 120, as measured by the corresponding one or more load cells 145. At the same time, the control boxes 150 may transmit output signals to the corresponding dispensing assemblies 140 based on signals from the controller 160 relating to the amount of bulk dry flowable materials 115 individually being dispensed from each vessel 120.

Each of the load cells, in one or more embodiments, is connected using a wired or wireless connection to a scale indicator (not shown), which communicates to a control box 150 a signal indicative of the weight of its corresponding vessel 120 and its contents as sensed by the one or more load cells. Accordingly, in one or more embodiments the control box 150 transmits the corresponding information to the controller 160. With information indicative of the weight of the one or more vessels 120, the controller 160 may use that information with an algorithm to determine the weight of dry flowable materials 115 in the one or more vessels 120. Furthermore, by monitoring the change in the weight of the dry flowable materials 115 being routed from the one or more vessels 120 into the mixed storage vessel 180 per unit of time, the flow rate of each of the bulk dry flowable materials 115 into the mixed storage vessel 180 may be determined. Moreover, these flow rates may be fed back to the controller 160 and/or control boxes 150 to check and/or adjust and/or modulate the one or more dispensing assemblies 140 to achieve the comparable time period discussed above.

In some embodiments, the dry good dispensing system 100 may employ the controller 160 for regulating the dispensing of dry flowable materials. For example, the controller 160 may be used to collect, process, and display data regarding activities at the site (either automatically using sensors at the site or manually entered into the system), perform calculations using that data, as described above, and/or execute instructions to perform various functions at a site (e.g., to open and/or close one or more of the dispensing assemblies 140 to achieve the comparable time period discussed above). The controller 160 may be a programmable logic controller (PLC), programmable automation controller (PAC), microcontroller, or some other type of programmable device that can receive input signals, send output signals, and process instructions. The controller 160 would be a component of a control system 161, which may also include an information handling system 165, which may serve as a human machine interface (HMI). Any suitable processing application software package may be used by the information handling system 165 to process the data in keeping with the principles of this disclosure (for example, supervisory control and data acquisition (SCADA) software).

In some embodiments, the controller 160 may be configured to handle complex control algorithms. As previously indicated, the controller 160 may employ an algorithm to determine various different inputs that may be advantageously used to achieve the comparable time period discussed above. As such, the controller 160 may be configured to handle algorithms for adjusting the opening and closing of each dispensing assembly 140, based on the amount of dry flowable materials being routed to the mixed storage vessel 180 as measured by the one or more load cells for each vessel 120.

The control system 161 may be centralized or distributed and may include one or more computer systems, one or more controllers, and peripheral input and output devices to interface with the physical system (sensors, valves, switches, etc.). Each computer system may have at least a processor for executing instructions and a memory for storing instructions and other data related to the computer system and the dispensing operations. A computer system may be one of a variety of devices having a processor and memory, including: a personal computer (laptop or desktop), a server, a workstation, a microcontroller, a microcomputer, a mobile device such as a smartphone or personal data assistant, or any similar system. Although many of these devices combine a processor and a memory in a single assembly, the processor and memory may be distributed among several devices capable of communicating with each other.

The memory for storing instructions may be in any format or combination of memory formats known in the art and accessible, directly or indirectly, by the processor. The memory may be in the form of installation memory, such as an installation CD/DVD-ROM or USB "thumb" drive, system memory (i.e., RAM), or other forms of computer storage including mechanical hard drives, solid-state hard drives, optical discs, tape drives, flash memory, or secure digital cards. Depending on the type of memory used, the memory may be configured in a redundant array of independent disks or similar arrangement that provides redundancy or improved performance. Instructions executed by the processor may be stored in the memory as software, firmware, or any other format suitable for execution by the processor. The programs stored in memory may be created using any programming techniques and in any programming language. In one embodiment, the controller 160 may perform one or more of a variety of functions including controlling dispensing equipment, collecting data from sensors, retrieving data from logs or look-up tables, performing calculations on the collected or retrieved data for analysis, monitoring the dispensing operations, communicating data to other computers or controllers using a local network or the internet, and storing data in a database or other similar form of collected data.

An operator may access the control system 161 through a graphical user interface (GUI) as presented to the operator on a display. The operator may start, stop, resume, and/or cancel the dispensing operations by using the GUI. In one embodiment, the GUI may dynamically display data in real-time. The GUI may also display historical data, enabling an operator to review data collected earlier or during the dispensing operations. The GUI may display graphs, charts, or other forms of data that may be manipulated or customized by a user or system administrator to emphasize particular data of interest. For example, in some embodiments, the GUI may display valve opening percentages, unit status, unit numbers, materials numbers, material descriptions, lot numbers, load cell readings, target dispensing weights, actual dispensing weights, real time percent deviation from the comparable time period, as well as likelihood of achieving the comparable time period. In some embodiments, the user may add trend lines, change colors, or limit the data to a specific period of the dispensing operations.

The controller 160 may be configured to issue alarms to personnel and equipment if the controller 160 detects an abnormal condition. For example, the controller 160 may issue an alarm if a sensor reading or a calculation result falls outside of a predetermined range of safe values. In response to the alarm, operators may manually modify dispensing operations to resolve the abnormal condition. Alternatively, the controller 160 may automatically respond to the alarm by entering into an alternate mode of operation directed to resolving the abnormal condition. If the abnormal condition is not removed after a certain time period, worsens, or is sufficiently outside of normal operating conditions, the controller 160 may send an emergency shutdown signal stopping certain pieces of equipment or halting dispensing operations altogether. For example, in some embodiments wherein the controller 160 detected that the comparable time period was not achieved, the controller 160 may instruct a person or machine to subject the dry flowable mixed materials 190 within the mixed storage vessel 180 to one or more additional blending steps.

Figure 2A:
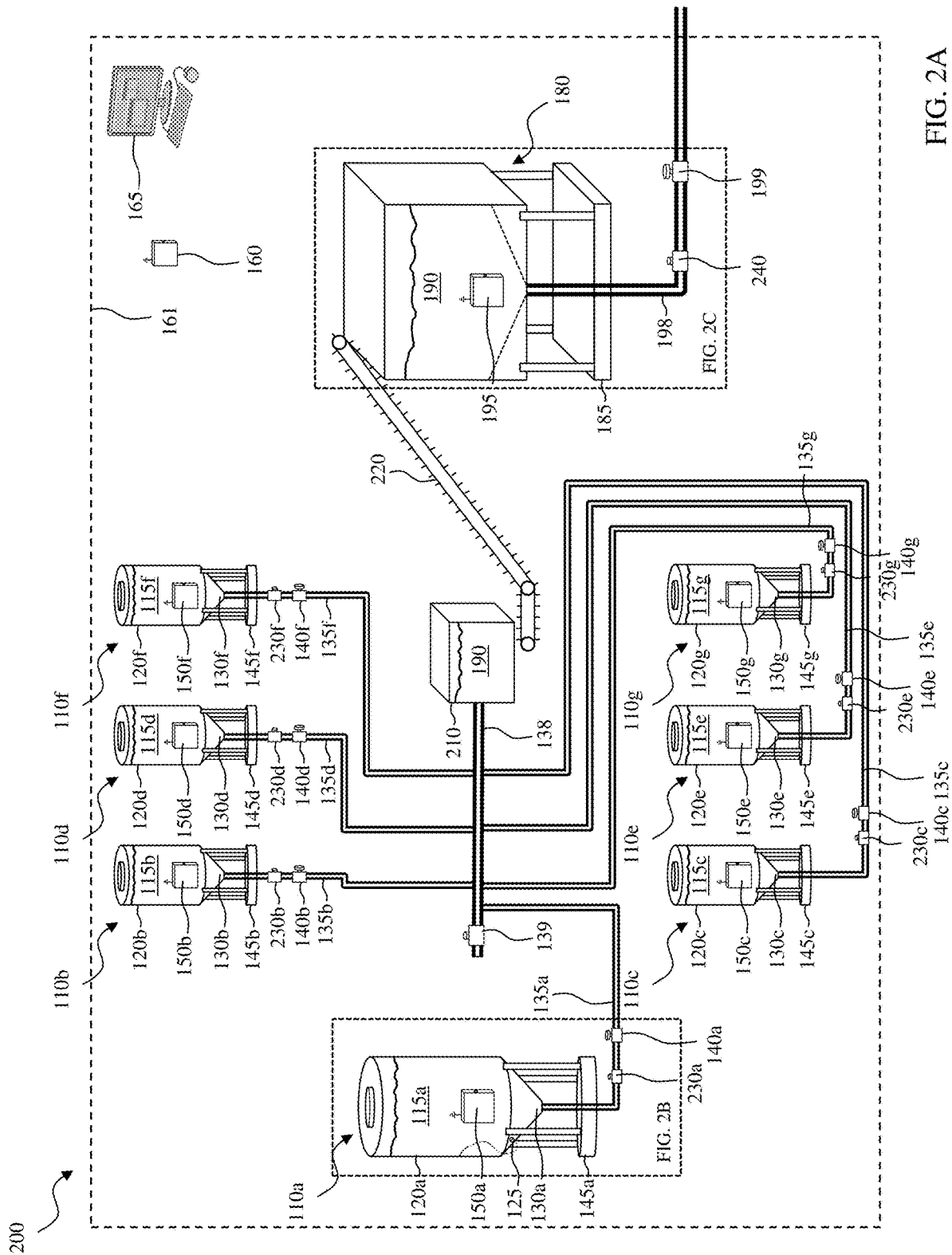
FIGS. 2A through 2C illustrate a schematic diagram of a dry good dispensing system designed, manufactured and/or operated in accordance with one or more alternative embodiments of the disclosure.
Figure 2B:
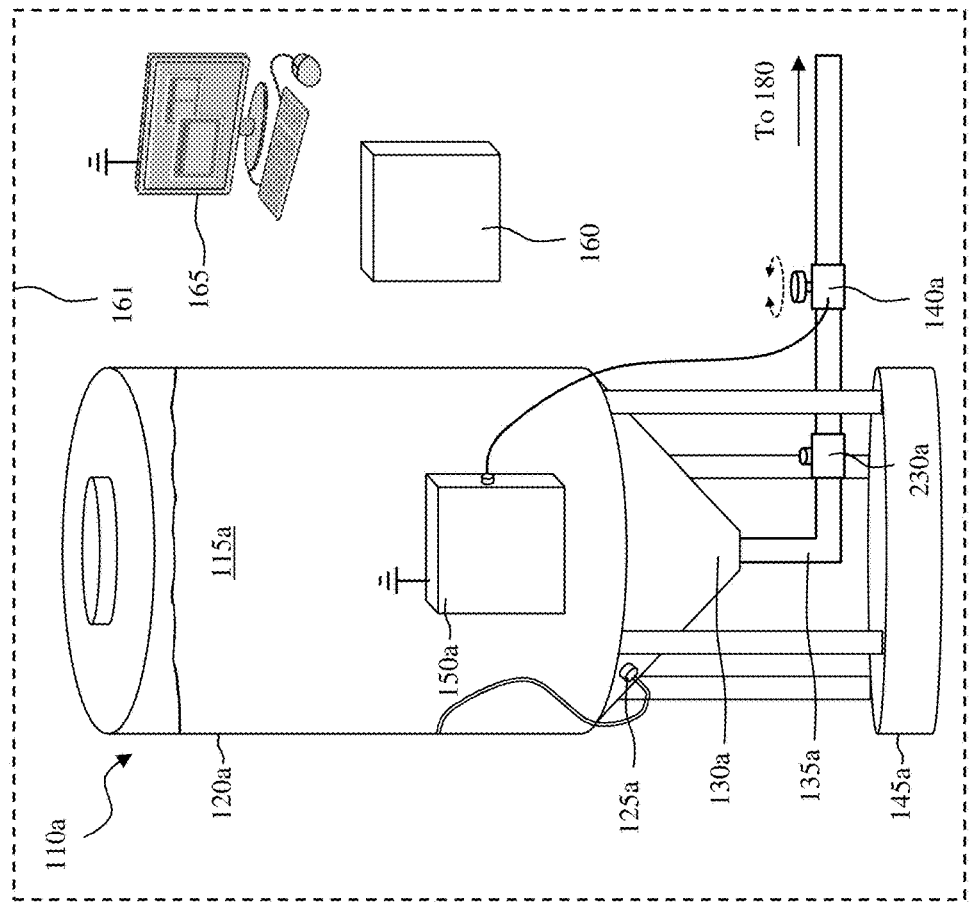
Figure 2C:
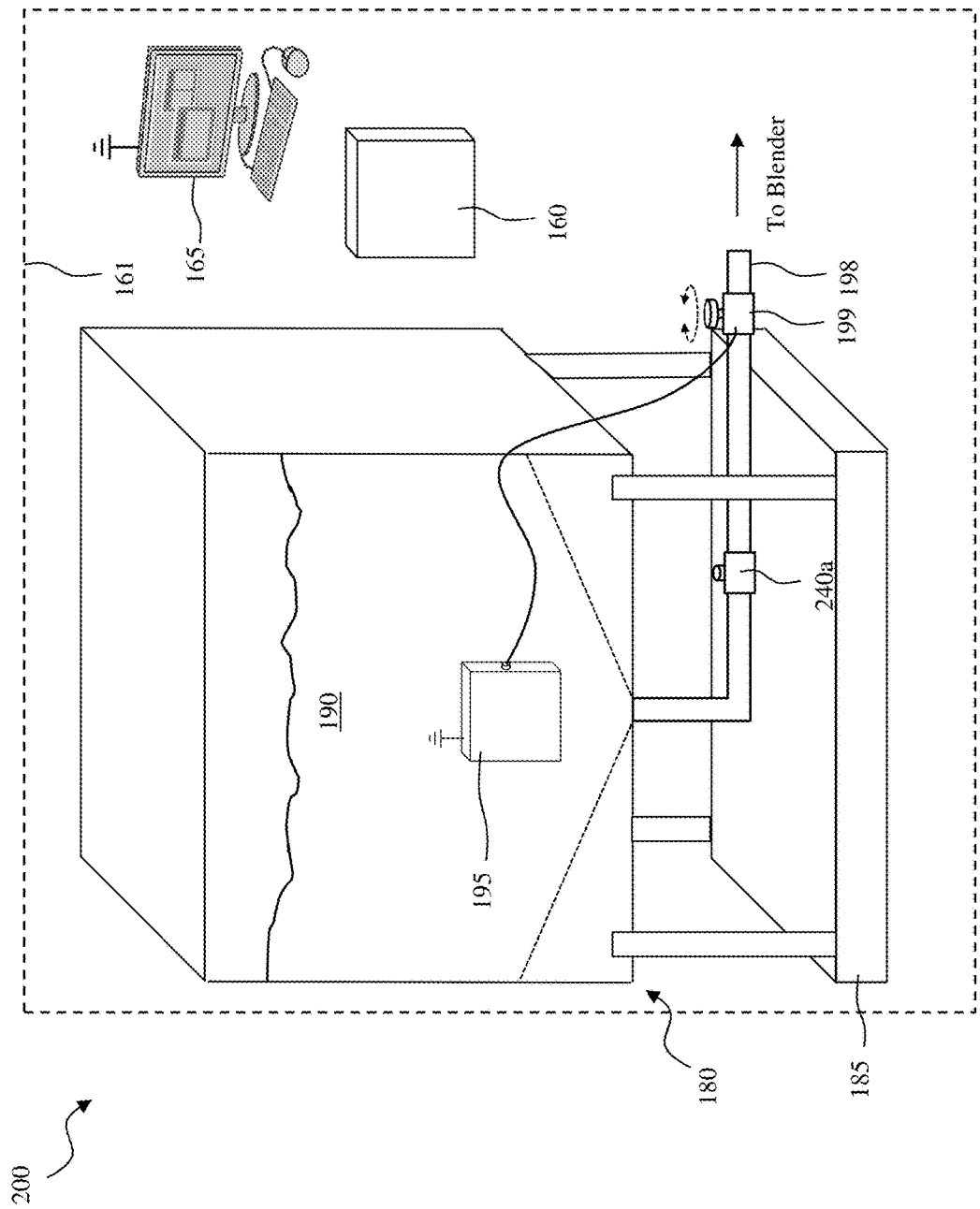

Turning to FIGS. 2A through 2C, illustrated is an alternative embodiment of a dry good dispensing system 200 designed, manufactured and/or operated according to one or more alternative embodiments of the disclosure. The dry good dispensing system 200 is similar in many respects to the dry good dispensing system 100 of FIGS. 1A and 1B. Accordingly, like reference numbers have been used to indicate similar, if not identical, features. The dry good dispensing system 200 differs, for the most part, from the dry good dispensing system 100, in that the dry good dispensing system 200 includes an intermediary storage container 210 positioned between each of the bulk storage containers 110 and the mixed storage vessel 180 (e.g., between the common conveyance 138 and the mixed storage vessel). Furthermore, the dry good dispensing system 200 additionally includes a bulk conveyance 220, such as a conveyor or auger, for transporting the dry flowable mixed material 190 from the intermediary storage container 210 to the mixed storage vessel 180.

In at least one embodiment, the dry good dispensing system 200 additionally includes first, second, third, fourth, fifth, sixth, and seventh flow meters 230*a*, 230*b*, 230*c*. 230*d*, 230*e*, 230*f*, 230*g*. The first, second, third, fourth, fifth, sixth, and seventh flow meters 230*a*, 230*b*, 230*c*, 230*d*, 230*e*, 230*f*, 230*g*, in one embodiment, may provide inputs to the controller 160, such that the controller 160 (e.g., along with the weight based readings of the load cells) may adjust the dispensing assemblies 140 to achieve the comparable time period discussed above. In at least one embodiment, the mixed storage vessel 180 additionally includes a flow meter 240. In yet other embodiments, the dry good dispending system 200 may include no flow meters.

Figure 3:
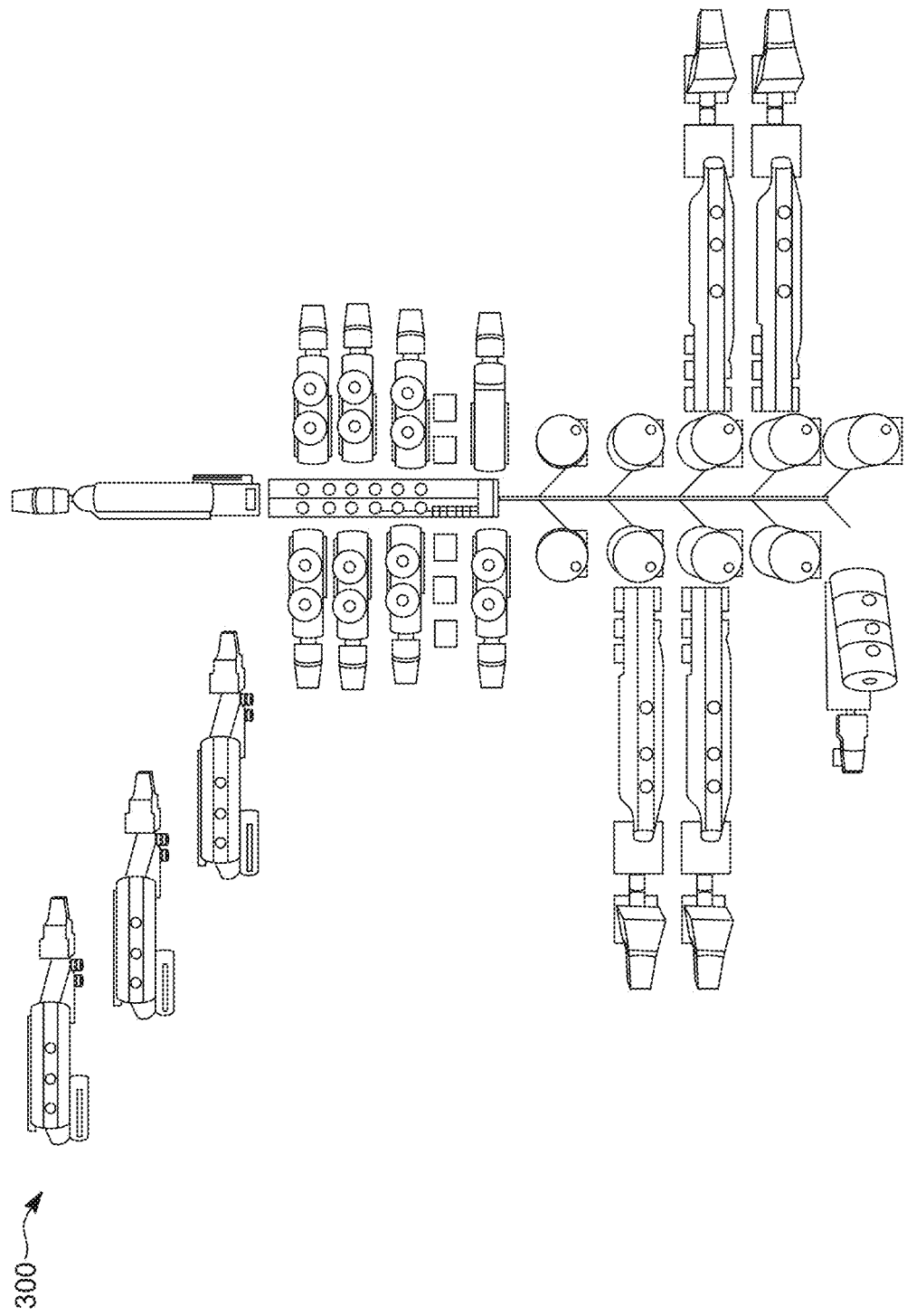
FIG. 3 illustrates one embodiment of a mobile dry good dispensing system designed, manufactured and/or operated according to one or more embodiments of the disclosure.

Turning to briefly to FIG. 3, illustrated is one embodiment of a mobile dry good dispensing system 300 designed, manufactured and/or operated according to one or more embodiments of the disclosure. The mobile dry good dispensing system 300 may include many, if not all, of the features discussed above with regard to FIGS. 1A through 2C.

Figure 4:
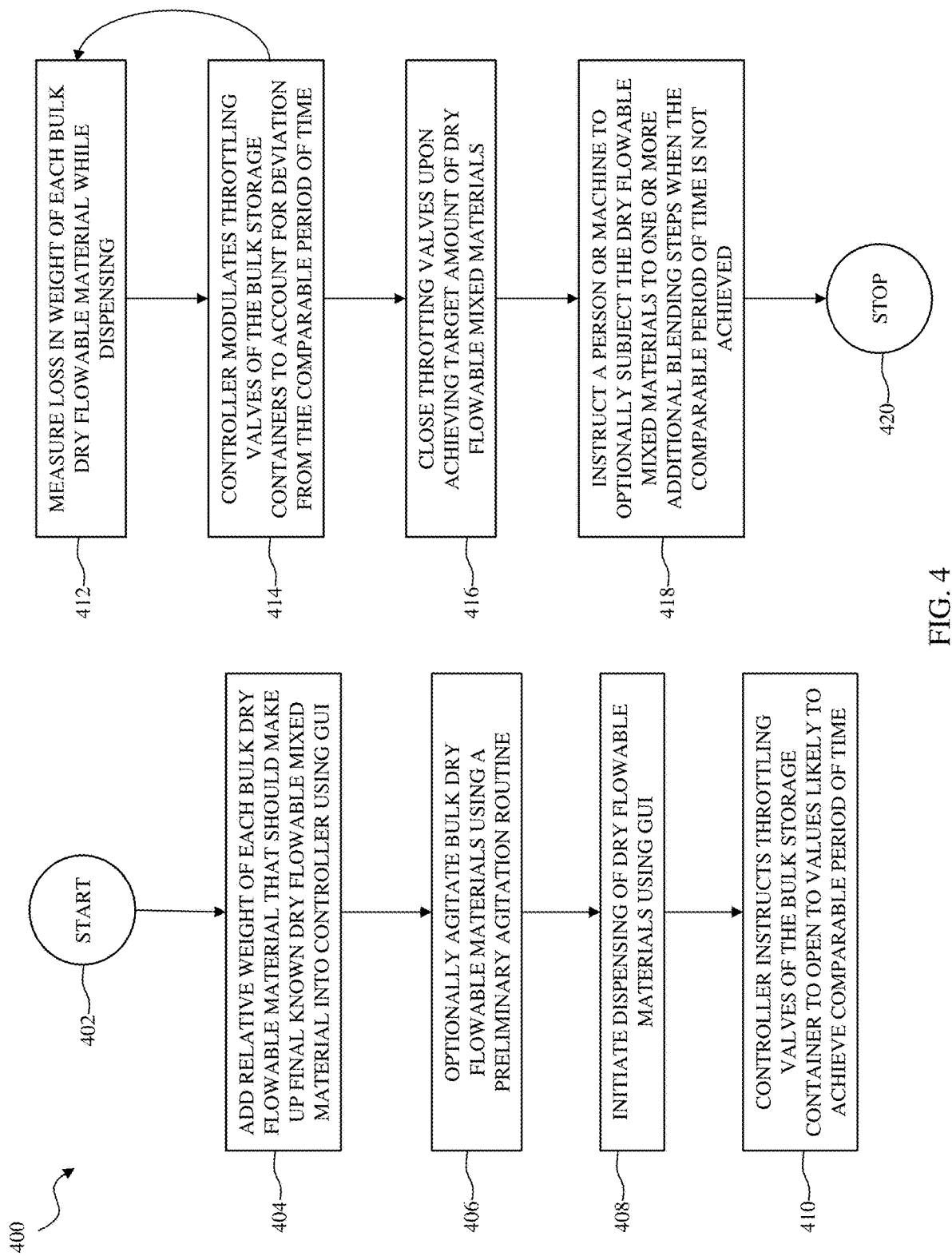
FIG. 4 illustrates a flow diagram of a method for using a dry good dispensing system, such as the dry good dispensing system of FIGS. 1A through 2C, according to one embodiment of the disclosure.

Turning to FIG. 4, illustrated is a flow diagram 400 of a method for using a dry good dispensing system, such as the dry good dispensing system of FIGS. 1A through 2C, according to one embodiment of the disclosure. The disclosed method of FIG. 4 is initiated in a start step 402.

Thereafter, an operator can add the relative weight of each bulk dry flowable material that should make up a known and/or desired amount of final dry flowable mixed material into the controller using an interface (e.g., GUI) at step 404. In some embodiments, the method of the present disclosure may include an option to begin the dispensing process with a preliminary agitation routine 406 in one or more vessels in order to loosen up the bulk dry flowable materials. In such embodiments, the preliminary agitation routine 406 may require that a vibrating, aerating, and/or agitation device be disposed on one or more vessels. Next, the disclosed method may initiate dispensing of the bulk dry flowable materials using the interface in step 408.

For dispensing the bulk dry flowable materials, the disclosed method may employ a controller to open the dispensing assemblies on corresponding vessels at step 410. At this step, the controller instructs the dispensing assemblies to open to values likely to achieve a comparable time period (e.g., as discussed above). Thereafter, in a step 412, a loss in weight of each bulk dry flowable material within each bulk storage container may be measured while dispensing. In one or more embodiments, one or more load cell bases associated with each of the bulk storage containers and coupled to the controller may be used to measure the loss in weight. Thereafter, in a step 414, the controller (e.g., if needed) may adjust the dispensing assemblies of the bulk storage containers to account for any deviations from the comparable time period. Steps 412 and 414 may repeat any number of times until the target amount of dry flowable mixed materials is achieved, wherein the controller may instruct the dispensing assemblies to close in a step 416. In a possible additional step 418, the controller may instruct a person or machine to subject the target amount of dry flowable mixed materials to one or more additional blending or boxing steps if/when the comparable time period is not achieved. The method could then stop in an end step 420.

To further improve the mobility, transportability, and rig-up speed at the job site, the systems and methods of the present disclosure may be transportable to and from a desired or predetermined location on a flatbed trailer or some other transportation unit. Alternatively, in some embodiments, the disclosed systems and methods may be integrated into one or more flatbed trailers so that the resultant dry good dispensing system is its own collection of transportation units. In such embodiments, the dry good dispensing system may include similar components as previously described for the dry good dispensing system of the present disclosure.

Aspects disclosed herein include:

A. A dry good dispensing system, the dry good dispensing system including: 1) a first bulk storage container for holding a first bulk dry flowable material therein, the first bulk storage container including: a) a first vessel having a first outlet disposed proximate a first bottom surface thereof; b) a first load cell base coupled with the first vessel, the first load cell base including at least one first load cell configured to measure a first load in the first vessel reflective of a first weight of the first bulk dry flowable material being discharged from the first vessel; and c) a first dispensing assembly coupled with the first outlet, the first dispensing assembly configured to controlled dispense the first amount of the first bulk dry flowable material being discharged from the first vessel; 2) a second bulk storage container for holding a second bulk dry flowable material therein, the second bulk storage container including: a) a second vessel having a second outlet disposed proximate a second bottom surface thereof; b) a second load cell base coupled with the second vessel, the second load cell base including at least one second load cell configured to measure a second load in the second vessel reflective of a second weight of the second bulk dry flowable material contained in the second vessel; and c) a second dispensing assembly coupled with the second outlet, the second dispensing assembly configured to controlled dispense the second amount of the second bulk dry flowable material being discharged from the second vessel; 3) a mixed storage vessel coupled to the first outlet via the first dispensing assembly and the second outlet via the second dispensing assembly; and 4) a controller in communication with the first dispensing assembly and the second dispensing assembly, the controller programmed to cause the first dispensing assembly to discharge and meter the first amount of the first dry flowable material to the mixed storage vessel and cause the second dispensing assembly to discharge and meter the second amount of the second dry flowable material to the mixed storage vessel over a comparable time period based upon weight based readings the controller receives from the first and second load cells.

B. A method, the method including: 1) providing a dry good dispensing system, the dry good dispensing system including: a) a first bulk storage container for holding a first bulk dry flowable material therein, the first bulk storage container including: i) a first vessel having a first outlet disposed proximate a first bottom surface thereof; ii) a first load cell base coupled with the first vessel, the first load cell base including at least one first load cell configured to measure a first load in the first vessel reflective of a first weight of the first bulk dry flowable material being discharged from the first vessel; and iii) a first dispensing assembly coupled with the first outlet, the first dispensing assembly configured to adjust anywhere between opened and closed to controlled dispense the first amount of the first bulk dry flowable material being discharged from the first vessel; b) a second bulk storage container for holding a second bulk dry flowable material therein, the second bulk storage container including: i) a second vessel having a second outlet disposed proximate a second bottom surface thereof; ii) a second load cell base coupled with the second vessel, the second load cell base including at least one second load cell configured to measure a second load in the second vessel reflective of a second weight of the second bulk dry flowable material contained in the second vessel; and iii) a second dispensing assembly coupled with the second outlet, the second dispensing assembly configured to adjust anywhere between opened and closed to controlled dispense the second amount of the second bulk dry flowable material being discharged from the second vessel; c) a mixed storage vessel coupled to the first outlet via the first dispensing assembly and the second outlet via the second dispensing assembly; and d) a programmed controller in communication with the first dispensing assembly, the first load cell, the second dispensing assembly, and the second load cell; and 2) modulating the first dispensing assembly to discharge and meter the first amount of the first dry flowable material to the mixed storage vessel and modulating the second dispensing assembly to discharge and meter the second amount of the second dry flowable material to the mixed storage vessel over a comparable time period using the programmed controller based upon weight based readings the controller receives from the first and second load cells.

Aspects A and B may have one or more of the following additional elements in combination: Element 1: wherein the controller is programmed to cause the first dispensing assembly to discharge and controlled dispense the first amount of the first dry flowable material to the mixed storage vessel and cause the second dispensing assembly to discharge and controlled dispense the second amount of the second dry flowable material to the mixed storage vessel over a similar time period based upon weight based readings the controller receives from the first and second load cells. Element 2: wherein the controller is programmed to cause the first dispensing assembly to discharge and controlled dispense the first amount of the first dry flowable material to the mixed storage vessel and cause the second dispensing assembly to discharge and controlled dispense the second amount of the second dry flowable material to the mixed storage vessel over an identical time period based upon weight based readings the controller receives from the first and second load cells. Element 3: wherein the controller is programmed to cause the first dispensing assembly to discharge and controlled dispense the first amount of the first dry flowable material to the mixed storage vessel and cause the second dispensing assembly to discharge and controlled dispense the second amount of the second dry flowable material to the mixed storage vessel over an exact time period based upon weight based readings the controller receives from the first and second load cells. Element 4: wherein the first output and the second output couple to a common conveyance positioned between the first and second bulk storage containers and the mixed storage vessel, the common conveyance configured to employ Karman vortex mixing to further mix the first and second bulk dry flowable materials travelling therethrough. Element 5: wherein one or more of the first dispensing assembly or the second dispensing assembly is a rotary air lock valve, a pinch valve, a butterfly valve, or a screw conveyor. Element 6: further including a first control box communicatively coupled with the first bulk storage container and a second control box communicatively coupled with the second bulk storage container, the first and second control boxed configured to receive instructions from the controller to adjust the first and second dispensing assemblies to achieve the comparable time period. Element 7: wherein the controller is part of a feedback loop to continually adjust the first and second dispensing assemblies until a target amount of dry flowable mixed material is received in the mixed storage vessel based upon continually updated static weight based readings the controller receives from the first and second load cells. Element 8: further including an intermediary storage container positioned between the first and second bulk storage containers and the mixed storage vessel, and further including a conveyance between the intermediary storage container and the mixed storage vessel. Element 9: wherein the dry good dispensing system is integrated into one or more mobile trailer units. Element 10: wherein modulating includes adjusting the first dispensing assembly to discharge and controlled dispense the first amount of the first dry flowable material to the mixed storage vessel and modulating the second dispensing assembly to discharge and controlled dispense the second amount of the second dry flowable material to the mixed storage vessel over a similar time period using the programmed controller. Element 11: wherein modulating includes adjusting the first dispensing assembly to discharge and controlled dispense the first amount of the first dry flowable material to the mixed storage vessel and modulating the second dispensing assembly to discharge and controlled dispense the second amount of the second dry flowable material to the mixed storage vessel over an identical time period using the programmed controller. Element 12: wherein modulating includes adjusting the first dispensing assembly to discharge and controlled dispense the first amount of the first dry flowable material to the mixed storage vessel and modulating the second dispensing assembly to discharge and controlled dispense the second amount of the second dry flowable material to the mixed storage vessel over an exact time period using the programmed controller. Element 13: wherein a first metering rate of the first amount will vary by less than 10 percent during the comparable time period and a second metering rate of the second amount will vary by less than 10 percent during the comparable time period. Element 14: wherein a first metering rate of the first amount will vary by less than 5 percent during the comparable time period and a second metering rate of the second amount will vary by less than 5 percent during the comparable time period. Element 15: wherein a first metering rate of the first amount will vary by less than 1 percent during the comparable time period and a second metering rate of the second amount will vary by less than 1 percent during the comparable time period.

Those skilled in the art to which this application relates will appreciate that other and further additions, deletions, substitutions and modifications may be made to the described embodiments.

What is claimed is:

1. A dry good dispensing system, comprising:
   a first bulk storage container for holding a first bulk dry flowable material therein, the first bulk storage container including:
      a first vessel having a first outlet disposed proximate a first bottom surface thereof;
      a first load cell base coupled with the first vessel, the first load cell base including at least one first load cell configured to measure a first load in the first vessel reflective of a first weight of the first bulk dry flowable material being discharged from the first vessel; and
      a first dispensing assembly coupled with the first outlet, the first dispensing assembly configured to controlled dispense the first amount of the first bulk dry flowable material being discharged from the first vessel;
   a second bulk storage container for holding a second bulk dry flowable material therein, the second bulk storage container including:
      a second vessel having a second outlet disposed proximate a second bottom surface thereof;
      a second load cell base coupled with the second vessel, the second load cell base including at least one second load cell configured to measure a second load in the second vessel reflective of a second weight of the second bulk dry flowable material contained in the second vessel; and
      a second dispensing assembly coupled with the second outlet, the second dispensing assembly configured to controlled dispense the second amount of the second bulk dry flowable material being discharged from the second vessel;
   a mixed storage vessel coupled to the first outlet via the first dispensing assembly and the second outlet via the second dispensing assembly; and
   a controller in communication with the first dispensing assembly and the second dispensing assembly, the controller programmed to cause the first dispensing assembly to discharge and meter the first amount of the first dry flowable material to the mixed storage vessel and cause the second dispensing assembly to discharge and meter the second amount of the second dry flowable material to the mixed storage vessel over a comparable time period based upon weight based readings the controller receives from the first and second load cells.

2. The dry good dispensing system as recited in claim 1, wherein the controller is programmed to cause the first dispensing assembly to discharge and controlled dispense the first amount of the first dry flowable material to the mixed storage vessel and cause the second dispensing assembly to discharge and controlled dispense the second amount of the second dry flowable material to the mixed storage vessel over a similar time period based upon weight based readings the controller receives from the first and second load cells.

3. The dry good dispensing system as recited in claim 1, wherein the controller is programmed to cause the first dispensing assembly to discharge and controlled dispense the first amount of the first dry flowable material to the mixed storage vessel and cause the second dispensing assembly to discharge and controlled dispense the second amount of the second dry flowable material to the mixed storage vessel over an identical time period based upon weight based readings the controller receives from the first and second load cells.

4. The dry good dispensing system as recited in claim 1, wherein the controller is programmed to cause the first dispensing assembly to discharge and controlled dispense the first amount of the first dry flowable material to the mixed storage vessel and cause the second dispensing assembly to discharge and controlled dispense the second amount of the second dry flowable material to the mixed storage vessel over an exact time period based upon weight based readings the controller receives from the first and second load cells.

5. The dry good dispensing system as recited in claim 1, wherein the first output and the second output couple to a common conveyance positioned between the first and second bulk storage containers and the mixed storage vessel, the common conveyance configured to employ Karman vortex mixing to further mix the first and second bulk dry flowable materials travelling therethrough.

6. The dry good dispensing system as recited in claim 1, wherein one or more of the first dispensing assembly or the second dispensing assembly is a rotary air lock valve, a pinch valve, a butterfly valve, or a screw conveyor.

7. The dry good dispensing system as recited in claim 1, further including a first control box communicatively coupled with the first bulk storage container and a second control box communicatively coupled with the second bulk storage container, the first and second control boxed configured to receive instructions from the controller to adjust the first and second dispensing assemblies to achieve the comparable time period.

8. The dry good dispensing system as recited in claim 1, wherein the controller is part of a feedback loop to continually adjust the first and second dispensing assemblies until a target amount of dry flowable mixed material is received in the mixed storage vessel based upon continually updated static weight based readings the controller receives from the first and second load cells.

9. The dry good dispensing system as recited in claim 1, further including an intermediary storage container positioned between the first and second bulk storage containers and the mixed storage vessel, and further including a conveyance between the intermediary storage container and the mixed storage vessel.

10. The dry good dispensing system as recited in claim 1, wherein the dry good dispensing system is integrated into one or more mobile trailer units.

11. A method, comprising:
providing a dry good dispensing system, the dry good dispensing system including:
a first bulk storage container for holding a first bulk dry flowable material therein, the first bulk storage container including:
a first vessel having a first outlet disposed proximate a first bottom surface thereof;
a first load cell base coupled with the first vessel, the first load cell base including at least one first load cell configured to measure a first load in the first vessel reflective of a first weight of the first bulk dry flowable material being discharged from the first vessel; and
a first dispensing assembly coupled with the first outlet, the first dispensing assembly configured to adjust anywhere between opened and closed to controlled dispense the first amount of the first bulk dry flowable material being discharged from the first vessel;
a second bulk storage container for holding a second bulk dry flowable material therein, the second bulk storage container including:
a second vessel having a second outlet disposed proximate a second bottom surface thereof;
a second load cell base coupled with the second vessel, the second load cell base including at least one second load cell configured to measure a second load in the second vessel reflective of a second weight of the second bulk dry flowable material contained in the second vessel; and
a second dispensing assembly coupled with the second outlet, the second dispensing assembly configured to adjust anywhere between opened and closed to controlled dispense the second amount of the second bulk dry flowable material being discharged from the second vessel;
a mixed storage vessel coupled to the first outlet via the first dispensing assembly and the second outlet via the second dispensing assembly; and
a programmed controller in communication with the first dispensing assembly, the first load cell, the second dispensing assembly, and the second load cell; and
modulating the first dispensing assembly to discharge and meter the first amount of the first dry flowable material to the mixed storage vessel and modulating the second dispensing assembly to discharge and meter the second amount of the second dry flowable material to the mixed storage vessel over a comparable time period using the programmed controller based upon weight based readings the controller receives from the first and second load cells.

12. The method as recited in claim 11, wherein modulating includes adjusting the first dispensing assembly to discharge and controlled dispense the first amount of the first dry flowable material to the mixed storage vessel and modulating the second dispensing assembly to discharge and controlled dispense the second amount of the second dry flowable material to the mixed storage vessel over a similar time period using the programmed controller.

13. The method as recited in claim 11, wherein modulating includes adjusting the first dispensing assembly to discharge and controlled dispense the first amount of the first dry flowable material to the mixed storage vessel and modulating the second dispensing assembly to discharge and controlled dispense the second amount of the second dry flowable material to the mixed storage vessel over an identical time period using the programmed controller.

14. The method as recited in claim 11, wherein modulating includes adjusting the first dispensing assembly to discharge and controlled dispense the first amount of the first dry flowable material to the mixed storage vessel and modulating the second dispensing assembly to discharge and controlled dispense the second amount of the second dry flowable material to the mixed storage vessel over an exact time period using the programmed controller.

15. The method as recited in claim 11, wherein the first output and the second output couple to a common conveyance positioned between the first and second bulk storage containers and the mixed storage vessel, the common conveyance configured to employ Karman vortex mixing to further mix the first and second dry flowable materials travelling therethrough.

16. The method as recited in claim 11, wherein one or more of the first dispensing assembly or the second dispensing assembly is a rotary air lock valve, a pinch valve, a butterfly valve, or a screw conveyor.

17. The method as recited in claim 11, wherein the controller is part of a feedback loop to continually adjust the first and second dispensing assemblies until a target amount of dry flowable mixed material is received in the mixed storage vessel based upon continually updated static weight based readings the controller receives from the first and second load cells.

18. The method as recited in claim 17, wherein a first metering rate of the first amount will vary by less than 10 percent during the comparable time period and a second metering rate of the second amount will vary by less than 10 percent during the comparable time period.

19. The method as recited in claim 17, wherein a first metering rate of the first amount will vary by less than 5 percent during the comparable time period and a second metering rate of the second amount will vary by less than 5 percent during the comparable time period.

20. The method as recited in claim 17, wherein a first metering rate of the first amount will vary by less than 1 percent during the comparable time period and a second metering rate of the second amount will vary by less than 1 percent during the comparable time period.

* * * * *